United States Patent [19]
Calderon

[11] Patent Number: 5,529,599
[45] Date of Patent: Jun. 25, 1996

[54] METHOD FOR CO-PRODUCING FUEL AND IRON

[76] Inventor: Albert Calderon, P.O. Box 126, Bowling Green, Ohio 43402

[21] Appl. No.: 555,509

[22] Filed: Nov. 8, 1995

Related U.S. Application Data

[63] Continuation of Ser. No. 375,612, Jan. 20, 1995, abandoned.

[51] Int. Cl.$^6$ ............................................. C21B 13/12
[52] U.S. Cl. ............................ 75/10.63; 75/493; 75/494; 75/505; 75/958
[58] Field of Search .................................. 75/10.63, 493, 75/494, 505, 958

[56] References Cited

U.S. PATENT DOCUMENTS 3,844,766  10/1974  Beggs ........................................ 75/494
4,927,430   5/1990  Calderon ................................... 48/210

*Primary Examiner*—Melvyn Andrews
*Attorney, Agent, or Firm*—Marshall & Melhorn

[57] ABSTRACT

A method for the co-production of fuel and iron from coal and from iron ore respectively, which is comprised of heating the coal in the absence of oxygen to make a raw coal gas and a residual coke, and of increasing the content of free hydrogen in the coal gas through the cracking against a desulfurizing hot reagent, of the hydrocarbons contained in the gas in order to yield a hydrogen rich, desulfurized, hot reducing synthetic gas. This synthetic gas which is highly reactive, is fed through a bed of iron ore in order to directly reduce the ore to metallized iron. The off-gas exiting from the bed of ore is divided into three parts:-a first part is mixed with the raw coal gas, and is recycled for further use; a second part is used to provide the thermal energy required for the heating of the coal to make the raw gas and the coke; and a third part which is purged to maintain the process in balance, is utilized for other thermal needs. The coke when made from metallurgical coal can be used as fuel for making iron in a blast furnace; the coke when made from non-metallurgical coal is gasified to make an additional gas which can be used as a fuel for generating electricity. Other carbonaceous materials may be added to the coal.

19 Claims, 3 Drawing Sheets

METHOD FOR CO-PRODUCING FUEL AND IRON

This application is a continuation of U.S. patent application Ser. No. 375,612 filed Jan. 20, 1995, and now abandoned.

BACKGROUND OF THE INVENTION

This invention relates to a new method for co-producing fuel and metallized iron from coal and from iron ore respectively. The metallized iron is also known as "directly reduced iron" (DRI).

The production of DRI from iron ore by using reducing gases reformed from natural gas has been commercially practiced for many decades. The main disadvantage in using natural gas is its high cost; another disadvantage is that it is not always available. Further, the natural gas needs to be reformed in a hydrogen producing plant; such a plant adds substantially to the capital cost of the facility that converts the iron ore to DRI. A study prepared for the Economic Development Administration of the U.S. Department of Commerce by Fordham University in 1981, the Summary & Conclusions of which are referenced herewith, indicates "the need to assign high priority to basic research into new methods of coal based direct reduction" (page xxvi, para. 3).

The present invention overcomes the above disadvantages and provides an efficient method which while producing fuel in the form of coke and/or gas can also co-produce DRI from iron ore, utilizing abundant coal as a base.

DRAWINGS

The embodiment of the invention is illustrated in the accompanying drawings, in which.

For the purpose of describing this invention, the term "coke" shall herein be inclusive of coke which is made from metallurgical coals and utilized for smelting iron such as in a blast furnace, and also of coke which is known as "char" which is made from non-metallurgical coals and is used for making gaseous fuel in a gasifier; such fuel being utilized for other purposes including the generation of electricity.

DESCRIPTION OF THE INVENTION

Figure 1:
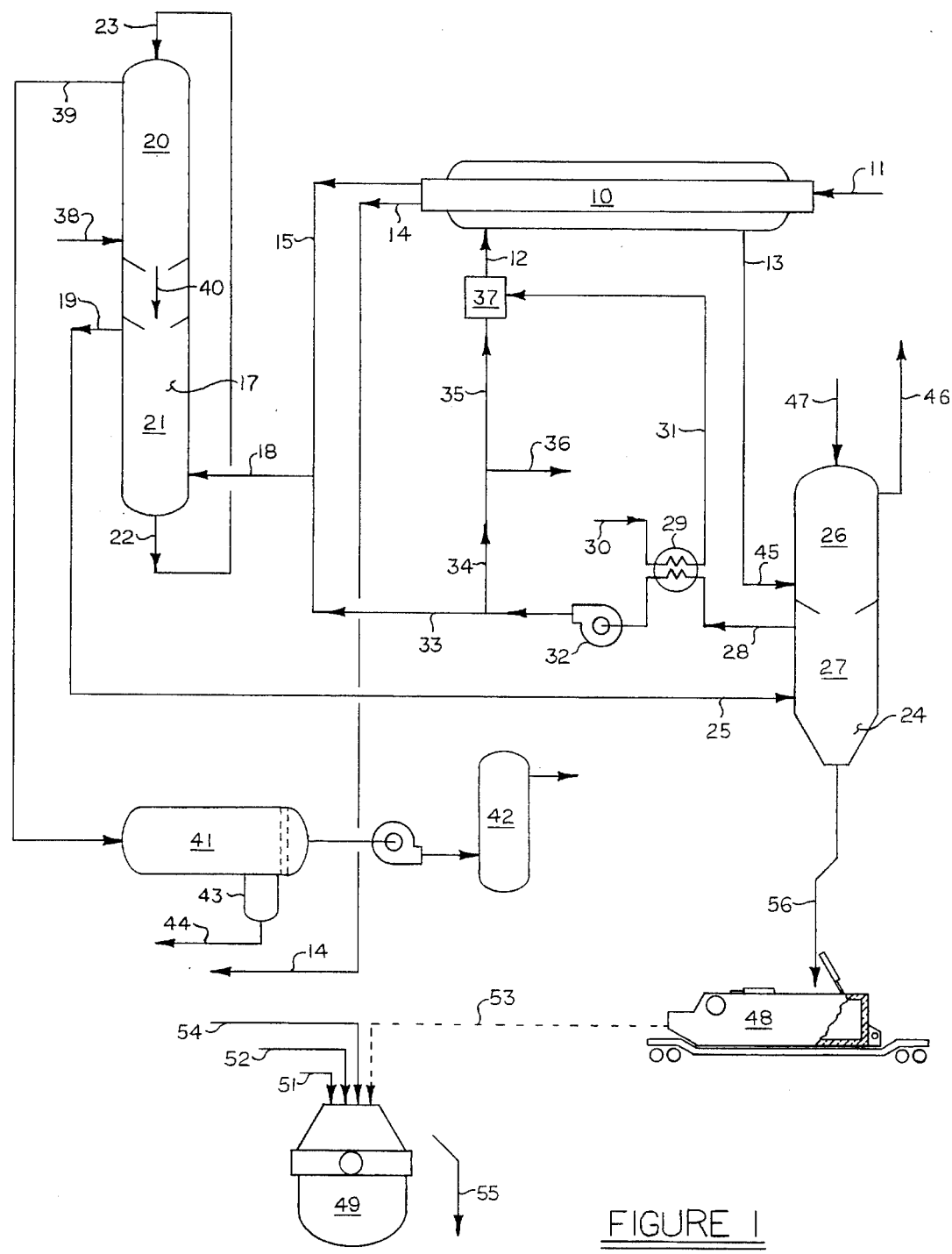
FIG. 1 is a flow diagram illustrating the co-production of coke and DRI in which the DRI is fed while hot into a covered insulated container for charging directly into a steelmaking furnace.
Figure 2:
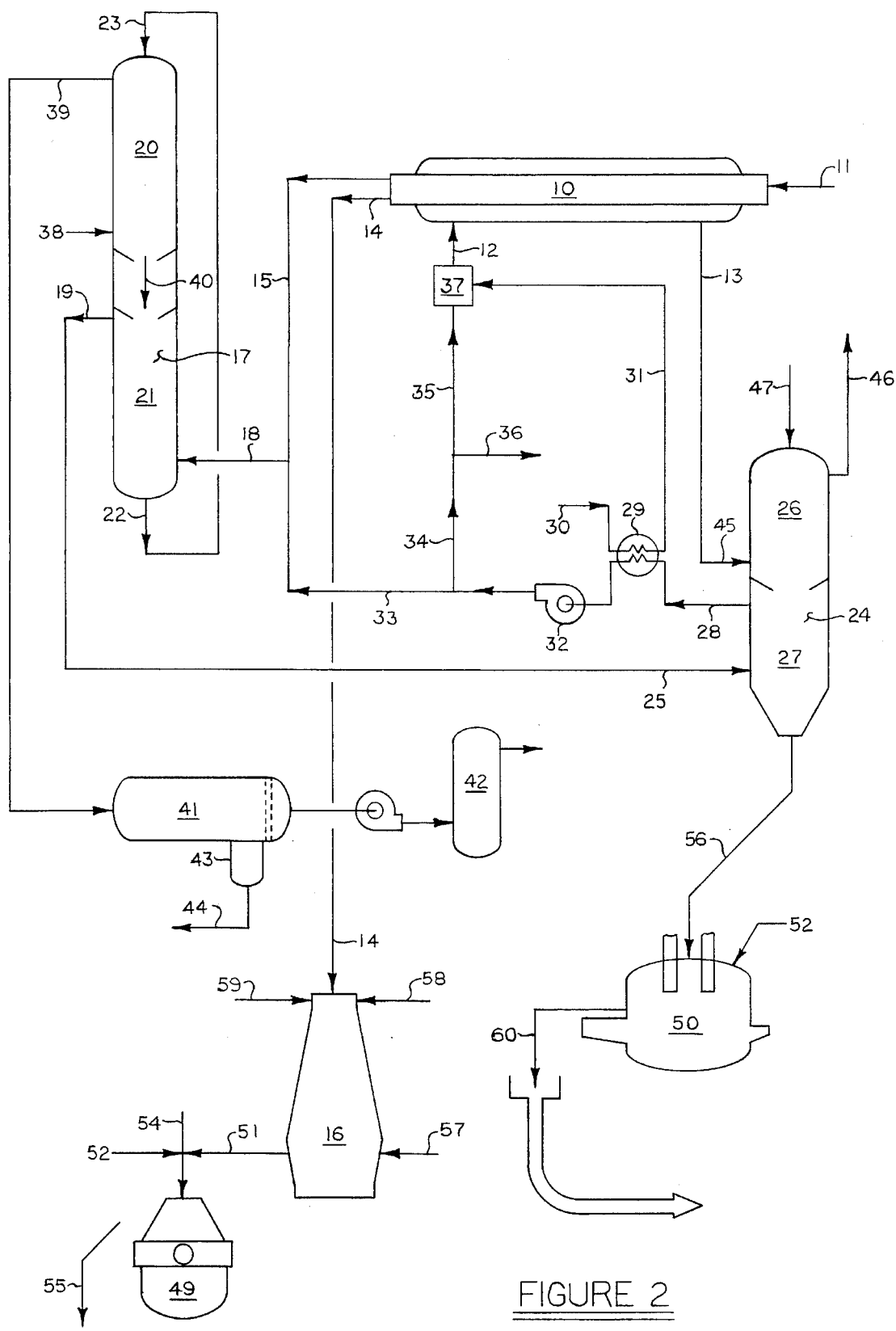
FIG. 2 is a flow diagram illustrating the co-production of coke and DIll in which the DRI is fed directly into an electric arc steelmaking furnace and the coke into a blast furnace.

Reference is made to FIGS. 1 and 2, in which numeral 10 is the retort in which the coal is heated in the absence of oxygen. The coal is introduced as shown by arrow I 1 and the hot flue gas is introduced to heat the coal as shown by arrow 12. The flue gas after heating the coal indirectly exits retort 10 at point 13. The coke is discharged as shown by arrow 14 and the raw coal gas exits retort 10 as illustrated by arrow 15. The coke is exported for use as a fuel to a furnace such as a blast furnace, shown in FIG. 2 and marked by numeral 16, or the coke is gasified in a gasifier (not shown) to produce a gas to be used as fuel for electric power generation for the electric arc furnace shown in FIG. 2 and denoted by numeral 50.

The flow of the raw gas to be cracked (stream 15) is directed to cracking unit 17 and enters this unit as shown by arrow 18; the cracked gas exits as shown by arrow 19. Cracking unit 17 holds the reagent against which the hydrocarbons contained in the raw gas are cracked. Preferably, cracking unit 17 is made into two pans; an upper chamber denoted by numeral 20 which is used to regenerate the reagent and a lower chamber denoted by numeral 21 which is used for the cracking operation proper. The reagent is recycled from the bottom of chamber 21 to the top of chamber 20 as shown by arrows 22 and 23. The gas leaving chamber 21 as shown by arrow 19 is a cracked, desulfurized, hot reducing synthetic gas which is highly reactive with iron ore; this synthetic gas enters reducing shaft 24 as shown by arrow 25.

Reducing shaft 24 is also preferably made into two parts; an upper part denoted by numeral 26 which serves as the preheating zone for the iron ore prior to the reduction reaction, and a lower part denoted by numeral 27 which serves as the reducing reaction zone for converting the ore to DRI. When the ore is preheated with the flue gas of stream 13, the flue gas enters preheating zone at point 45 and exits at point 46. The iron ore which is in pellet form is introduced into the top of shaft 24 as shown by arrow 47. The synthetic gas after the reducing reaction leaves zone 27 as shown by arrow 28 as an off-gas.

This off-gas which still possesses utilitarian value is first used to preheat combustion air in heat exchanger 29; this combustion air enters as shown by arrow 30 and exits as shown by arrow 31. The off-gas after being cooled in heat exchanger 29 is boosted in pressure by blower (compressor) 32 and is divided into stream 33 and stream 34; stream 34 is further divided into stream 35 and stream 36. Stream 33 is a first portion of the off-gas which joins raw gas stream 15 to form stream 18 and is thus recycled. Stream 35 is a second portion of the off-gas which is combusted in burner 37 to provide the thermal energy required for heating the coal to make the coke and generate the raw coal gas. Stream 36 is a third portion of the off-gas which is purged in order to maintain the process in balance; this third portion is also used for other thermal energy needs.

In the regeneration of the sorbent in chamber 20 air is introduced at the bottom as shown by arrow 38 and the regeneration gas exits at the top of chamber 20 indicated by stream 39; the reactions in chamber 20 are highly exothermic resulting in heating the reagent which descends with minimum heat loss into chamber 21 as shown by arrow 40. The regeneration gas is directed to condenser 41 where the gas is cooled for the removal of sulfur and further processed in column 42. The sulfur is recovered in holding tank 43 and drained as shown by arrow 44.

In operation, and still referring to FIG. 1, the coal is introduced at point 11 of retort 10 and the ore at point 47 of reducing shaft 24. The coke is directed via stream 14 to either a blast furnace or a gasifier; the DRI is fed into insulated container 48 in order to accept the DRI while still hot, thus minimizing heat loss. The oxygen steelmaking furnace denoted by numeral 49, receives a charge of molten iron (arrow 51), scrap (arrow 52), DRI (arrow 53) and oxygen (arrow 54) in order to make steel; furnace 49 is rotated to discharge the molten steel denoted by arrow 55. Stream 14 could represent metallurgical coke if metallurgical coals are used in retort 10; stream 14 could also represent a non-metallurgical coke (char) if non-metallurgical coals are used in retort 10.

Referring to FIG. 2, the flow diagram shown is the same as the one shown in FIG. 1 with a variation. Stream 14 (the coke stream) is directed to blast furnace 16 where iron ore (stream 58) and stone (stream 59) are added to the coke. A blast of air (stream 57) is introduced at the bottom of blast furnace 16. The DRI is fed directly into electric arc furnace 50 via stream 56, and steel is tapped as shown by stream 60.

Figure 3:
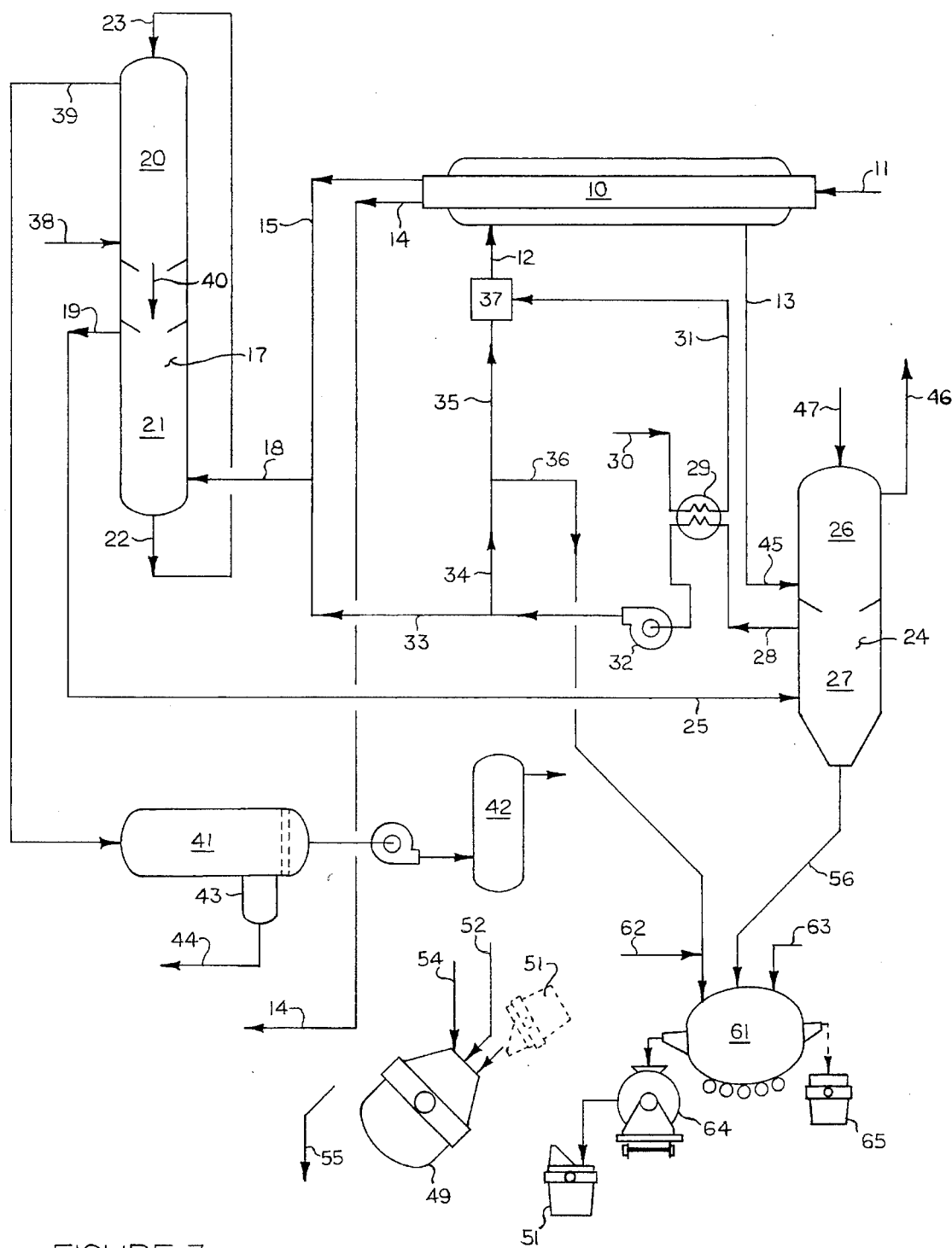
FIG. 3 is a flow diagram illustrating the co-production of coke and DRI in which the DRI is melted in a furnace prior to its being charged into an oxygen steelmaking furnace.

Referring to FIG. 3, the flow diagram shown is the same as the one shown in FIG. 1 with still another variation. Stream 56 (the DRI stream) is fed into a melting furnace denoted by numeral 61 and the purge gas (stream 36) is used to fuel furnace 61. Air (stream 62) and flux (stream 63) are added in order to convert the DRI to molten metal which is charged into steelmaking furnace 49 by means of transfer car 64 and ladle 51. The slag is collected in cinder pot 65.

If coke from non-metallurgical coals is produced, stream 14 is directed to a gasifier (not shown) and the coke is converted to a gas which is then used as a fuel to generate electricity; this electricity can be utilized for various energy needs inclusive of the operation of the electric arc furnace shown in FIG. 2. In addition to using non-metallurgical coals, other carbonaceous materials may be added to the charge, as for example tires, biomass, paper, plastics, etc.

I claim:

1. A method for the co-production of fuel and iron from coal and from iron ore respectively, comprising the following steps:

heating coal in a pyrolysis chamber in the absence of oxygen to make a raw coal gas and a coke, the coal gas containing hydrocarbons;

directing the raw coal gas to a cracking unit and cracking the hydrocarbons in the raw coal gas against a desulfurizing reagent to remove sulfur and increase hydrogen, which transforms the raw coal gas into a reducing gas;

feeding the reducing gas through a bed of iron ore in a reduction furnace to directly reduce the iron ore to a metallized iron, and to produce an off-gas; and directing a portion of the off-gas from the reduction furnace to a combustion unit and combusting the off-gas to provide thermal energy to the pyrolysis chamber.

2. The method of co-production defined in claim 1, including the additional step of directing the coke from the pyrolysis chamber to a furnace for use as a fuel concurrently with the direction of the raw coal gas to the cracking unit.

3. The method of co-production defined in claim 1, including the additional step of directing the coke from the pyrolysis chamber to a gasifier to produce a fuel gas concurrently with the direction of the raw coal gas to the cracking unit.

4. The method of co-production defined in claim 1, including, after the off-gas is produced during the reduction of the iron ore and a first-portion of the off-gas is directed from the reduction furnace to the combustion unit, the additional steps of concurrently recycling a second portion of the off-gas by combining the off-gas from the reduction furnace with the raw coal gas from the pyrolysis chamber, and directing the combination of the raw coal gas and the off-gas to the cracking unit.

5. The method of co-production defined in claim 4, including the additional step of concurrently purging a third portion of the off-gas from the reduction furnace for maintaining the process in balance.

6. The method of co-production defined in claim 1, wherein the step of feeding the reducing gas through a bed of iron ore includes the additional step of heating the reducing gas for increased reactivity with the iron ore.

7. The method of co-production defined in claim 1, wherein combusting the off-gas in the combustion unit to provide thermal energy to the pyrolysis chamber includes transferring the thermal energy to the pyrolysis chamber and the additional step of transferring a residual thermal energy from the pyrolysis chamber to the reduction furnace for preheating the iron ore.

8. The method of co-production defined in claim 1, including the additional step of discharging the metallized iron from the reduction furnace and charging the metallized iron into a steel-making furnace.

9. The method of co-production defined in claim 8, including the additional step of maintaining the metallized iron in a heated condition while the metallized iron is transferred from the reduction furnace to a steel-making furnace, and charging the hot metallized iron into the steelmaking furnace.

10. The method of co-production defined in claim 8, including, after directing tile metallized iron from the reduction furnace, the additional step of melting the metallized iron prior to charging the metallized iron into the steel-making furnace.

11. The method of co-production defined in claim 8, including the additional steps of directing the coke from the pyrolysis chamber to a gasifier to produce a fuel gas concurrently with the direction of the raw coal gas to the Cracking unit, and generating electricity from the fuel gas to power the steel-making furnace.

12. A method for the co-production of fuel and iron from coal and from iron ore respectively, for use in steel production, said method comprising the following steps:

heating coal in a pyrolysis chamber in the absence of oxygen to make a raw coal gas and a coke, the coal gas containing hydrocarbons;

directing the raw coal gas to a cracking unit and cracking the hydrocarbons in the raw coal gas against a desulfurizing reagent to remove sulfur and increase hydrogen, which transforms the raw coal gas into a reducing gas;

directing the coke from the pyrolysis chamber to an iron-making blast furnace for use as a fuel;

feeding the reducing gas through a bed of iron ore in a reduction furnace to directly reduce the iron ore to a metallized iron, and to produce an off-gas;

directing a first portion of the off-gas from the reduction furnace to a combustion unit and combusting the off-gas to provide thermal energy to the pyrolysis chamber;

recycling a second portion of the off-gas by combining the off-gas from the reduction furnace with the raw coal gas from the pyrolysis chamber, and directing the combination of the raw coal gas and the off-gas to the cracking unit; and discharging the metallized iron from the reduction furnace and charging the metallized iron into the steelmaking furnace.

13. A method for the co-production of fuel and iron from coal and from iron ore respectively, for use in steel production, said method comprising the following steps:

heating coal in a pyrolysis chamber in the absence of oxygen to make a raw coal gas and a coke, the coal gas containing hydrocarbons;

directing the raw coal gas to a cracking unit and cracking the hydrocarbons in the raw coal gas against a desulfurizing reagent to remove sulfur and increase hydrogen, which transforms the raw coal gas into a reducing gas;

directing the coke from the pyrolysis chamber to a gasifier to produce a fuel gas, and generating electricity from the fuel gas to power a steel-making furnace;

feeding the reducing gas through a bed of iron ore in a reduction furnace to directly reduce the iron ore to a metallized iron, and to produce an off-gas;

directing a first portion of the off-gas from the reduction furnace to a combustion unit and combusting the off-gas to provide thermal energy to the pyrolysis chamber;

recycling a second portion of the off-gas by combining the off-gas from the reduction furnace with the raw coal gas from the pyrolysis chamber, and directing the combination of the raw coal gas and the off-gas to the cracking unit; and discharging the metallized iron from the reduction furnace and charging the metallized iron into the steelmaking furnace.

14. A method for the co-production of fuel and iron from coal and from iron ore respectively, comprising the following steps:

heating coal in a pyrolysis chamber in the absence of oxygen to make a raw coal gas and a coke, the coal gas containing hydrocarbons;

directing the raw coal gas to a cracking unit and cracking the hydrocarbons in the raw coal gas against a desulfurizing reagent to remove sulfur and increase hydrogen, which transforms the raw coal gas into a reducing gas; and feeding the reducing gas through a bed of iron ore in a reduction furnace to directly reduce the iron ore to a metallized iron, and to produce an off-gas.

15. The method of co-production defined in claim 14, including the additional step of directing the off-gas from the reduction furnace to a combustion unit to provide thermal 16. The method of co-production defined in claim 14, including the additional step of directing the coke from the pyrolysis chamber to a furnace for use as a fuel concurrently with the direction of the raw coal gas to the cracking unit.

17. The method of co-production defined in claim 14, including the additional step of directing the coke from the pyrolysis chamber to a gasifier to produce a fuel gas concurrently with the direction of the raw coal gas to the cracking unit.

18. The method of co-production defined in claim 14, wherein the step of feeding the reducing gas through a bed of iron ore includes the additional step of heating the reducing gas for increased reactivity with the iron ore.

19. The method of co-production defined in claim 14, including the additional step of feeding the coke and the metallized iron into a melting furnace.

* * * * *